United States Patent
Gkoulalas-Divanis et al.

(10) Patent No.: US 11,216,589 B2
(45) Date of Patent: Jan. 4, 2022

(54) DATASET ORIGIN ANONYMIZATION AND FILTRATION

(71) Applicant: International Business Machines Corporation, Armonk, NY (US)

(72) Inventors: Aris Gkoulalas-Divanis, Waltham, MA (US); Paul R. Bastide, Ashland, MA (US); Rohit Ranchal, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/815,185

(22) Filed: Mar. 11, 2020

(65) Prior Publication Data

US 2021/0286898 A1 Sep. 16, 2021

(51) Int. Cl.
*G06F 21/00* (2013.01)
*G06F 21/62* (2013.01)

(52) U.S. Cl.
CPC .............................. *G06F 21/6254* (2013.01)

(58) Field of Classification Search
CPC .................................................. G06F 21/6254
See application file for complete search history.

(56) References Cited

U.S. PATENT DOCUMENTS

| | | | |
|---|---|---|---|
| 8,238,601 B2 | 8/2012 | Lu | |
| 8,316,054 B2 | 11/2012 | El Emam et al. | |
| 9,129,117 B2 * | 9/2015 | Chen | G06F 21/577 |
| 9,153,006 B2 | 10/2015 | Petrovic et al. | |
| 9,202,081 B2 | 12/2015 | Huang et al. | |
| 9,858,426 B2 * | 1/2018 | Freudiger | H04L 63/105 |
| 2013/0198194 A1 * | 8/2013 | Chen | G06F 21/6254 |
| | | | 707/740 |
| 2016/0142379 A1 | 5/2016 | Tawakol et al. | |
| 2018/0082082 A1 | 3/2018 | Lowenberg et al. | |
| 2018/0232488 A1 * | 8/2018 | Jafer | G06F 21/6254 |
| 2018/0330113 A1 | 11/2018 | McGrath et al. | |
| 2018/0365193 A1 * | 12/2018 | Chattopadhyay | G06F 17/12 |

(Continued)

OTHER PUBLICATIONS

Reaves et al., "Characterizing the Security of the SMS Ecosystem with Public Gateways", ACM Transactions on Privacy and Security, vol. 22, Issue 1, Jan. 2019.*

(Continued)

*Primary Examiner* — Morshed Mehedi
(74) *Attorney, Agent, or Firm* — Cantor Colburn LLP; Will Stock

(57) ABSTRACT

Embodiments also include a method for filtering and securing content of datasets in computer readable form designated for release to reduce discernable inferences therein. The method includes receiving a first dataset having first records associated with a quasi-identifier. The first records have respective first data values associated with the quasi-identifier. The method includes receiving a second dataset having second records associated with the quasi-identifier. The second records have respective second data values associated with the quasi-identifier. The method includes defining a first cluster having a first boundary based on a combination of the first dataset and the second dataset. The method includes replacing a first one of the first data values with the first boundary and a second one of the second data values with the first boundary.

20 Claims, 7 Drawing Sheets

(56) References Cited

U.S. PATENT DOCUMENTS

| | | | |
|---|---|---|---|
| 2018/0371519 A1* | 12/2018 | Lee | C12Q 1/04 |
| 2019/0087604 A1 | 3/2019 | Antonatos et al. | |
| 2019/0130129 A1 | 5/2019 | Huang | |
| 2019/0303618 A1 | 10/2019 | Gkoulalas-Divanis | |
| 2021/0200901 A1* | 7/2021 | Vemula | G06K 9/6224 |
| 2021/0279219 A1* | 9/2021 | Fenton | G06F 16/2264 |
| 2021/0286898 A1* | 9/2021 | Gkoulalas-Divanis | G06F 21/6254 |

OTHER PUBLICATIONS

A. Gkoulalas-Divanis et al. "Toward Smarter Healthcare: Anonumizing Medical Data to Support Research Studies", IBM J. Res. & Dev., vol. 58, No. 1, Paper 9, Jan./Feb. 2014, 11 Pages.

Holohan, N. et al. "(κ,ϵ)-Anonymity: κ-Anonymity with ϵ-Differential Privacy", v1, Submitted on Oct. 4, 2017, Retrieved from https://arxiv.org/abs/1710.01615, 12 Pages.

κ-anonymity. Wikipedia. Retrieved: Feb. 18, 2020 from https://en.wikipedia.org/wiki/κ-anonymity, 6 Pages.

Arora et al. "Range Clustering : An Algorithm for Empirical Evaluation of Classical Clustering Algorithms", 2016 Ninth International Conference on Contemporary Computing (IC3), Aug. 11-13, 2016, 4 Pages.

Domingo-Ferrer et al. "Database Anonymization: Privacy Models, Data Utility, and Microaggregation-based Inter-model Connections", Synthesis Lectures on Information Security Privacy and Trust, Jan. 2016, 137 Pages.

\* cited by examiner

DATASET ORIGIN ANONYMIZATION AND FILTRATION

BACKGROUND

The present invention relates to content filtering, and more specifically, to dataset anonymization and filtration for use by multitenant cloud computing apparatuses or other computing systems.

SUMMARY

Embodiments of the present invention are directed to methods, systems, circuitry, and products for filtering and securing content of datasets in computer readable form designated for release to reduce discernable inferences therein. A network server includes a digital storage. The network server includes a filtration program having instructions stored on the digital storage operable upon execution by the network server to receive a first dataset having first records associated with a quasi-identifier, the first records have respective first data values associated with the quasi-identifier. The instructions are further operable to receive a second dataset having second records associated with the quasi-identifier. The second records have respective second data values associated with the quasi-identifier. The instructions are further operable to define a first cluster having a first boundary based on a combination of the first dataset and the second dataset. The instructions are further operable to replace a first one of the first data values with the first boundary and a second one of the second data values with the first boundary.

Embodiments also include a method for filtering and securing content of datasets in computer readable form designated for release to reduce discernable inferences therein. The method includes receiving a first dataset having first records associated with a quasi-identifier. The first records have respective first data values associated with the quasi-identifier. The method includes receiving a second dataset having second records associated with the quasi-identifier. The second records have respective second data values associated with the quasi-identifier. The method includes defining a first cluster having a first boundary based on a combination of the first dataset and the second dataset. The method includes replacing a first one of the first data values with the first boundary and a second one of the second data values with the first boundary.

Embodiments further include a system for filtering and securing content of datasets in computer readable form designated for release to reduce discernable inferences therein. The system includes a storage device. The storage device includes a first dataset having first records associated with a quasi-identifier. The first records have respective first data values associated with the quasi-identifier. The storage device includes a second dataset having second records associated with the quasi-identifier. The second records have respective second data values associated with the quasi-identifier. The system includes a filtration program having instructions stored on a network server operable upon execution by the network server to define a first cluster having a first boundary based on a combination of the first dataset and the second dataset. The instructions are further operable to replace a first one of the first data values with the first boundary and a second one of the second data values with the first boundary.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
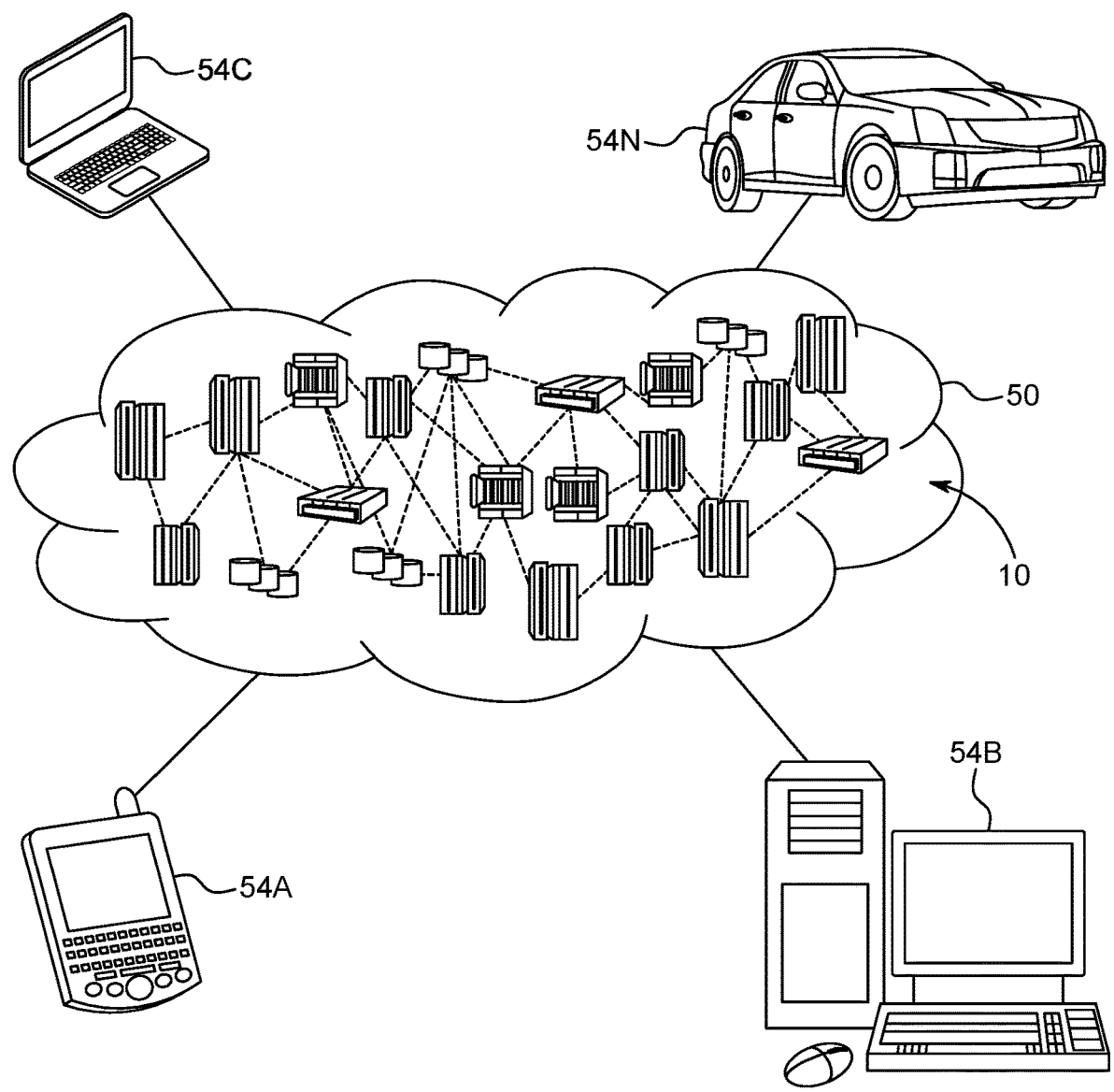
FIG. 1 depicts a cloud computing environment according to one or more implementations of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
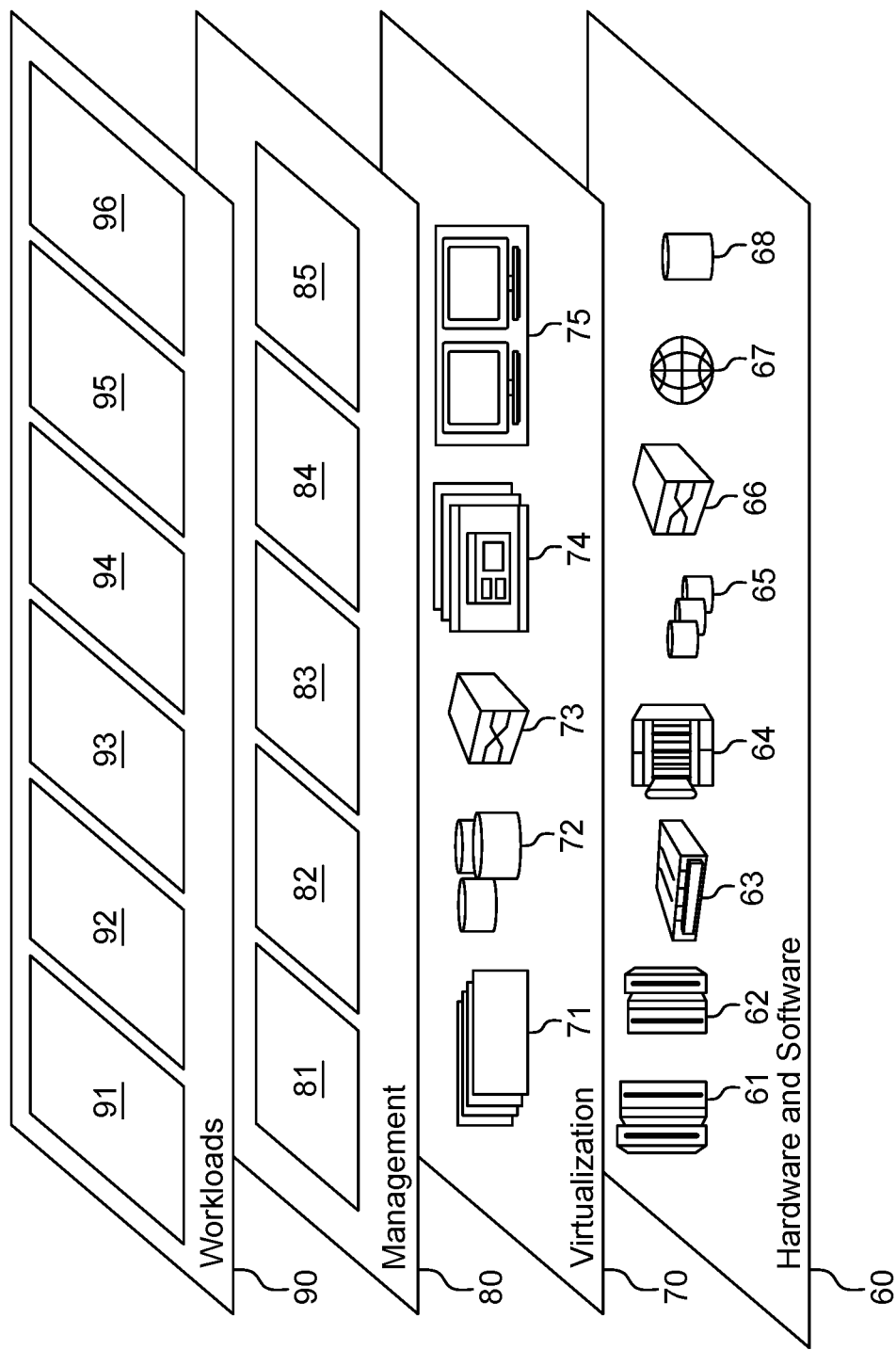
FIG. 2 depicts abstraction model layers according to one or more implementations of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65, that may have datastores with multiple tenants disposed therein (e.g., multitenancy datastore); and networks and networking components 66. In some embodiments, software components include network application server software 67 and database software 68. Any one or combination thereof which may be a network server.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and filtration programs 96.

Filtration programs 96 may solve, broadly, the problem of data confidentiality. Many solutions to data confidentiality exist today. As an example, encryption may be used to protect the confidentiality of data in transit or at rest. As such, this disclosure does not seek to forestall all solutions to the confidentiality problem. One or more non-contemporary solutions to the confidentiality problem are described herein.

Data anonymization aims to create a counterpart of an original data that sufficiently protects the privacy and discernable inferences of the individuals who are represented in the data, while incurring minimal data distortion. Data distortion corresponds to changes made to the data values of the original dataset in order to accommodate for privacy protection. When data are anonymized without consideration of a particular workload that they will need to support, minimum data distortion corresponds to minimum overall information loss or, equivalently, maximum data utility.

By construction, the fact that anonymization aims to minimally distort the original data in order to offer privacy-protection comes with the serious side-effect that it may be rather simple for an adversary to associate an anonymous data release to a particular tenant (data owner) of a cloud computing platform. Several data characteristics, such as information about the population that is recorded in a dataset, the high frequency of certain values, etc., make the task of associating an anonymous dataset with a particular tenant a rather simple task. In several cases, however, such inferences are sensitive and must be blocked even though they may only provide identification of the tenant associated with the dataset, not the individual whose information is represented in a data record.

Figure 3:
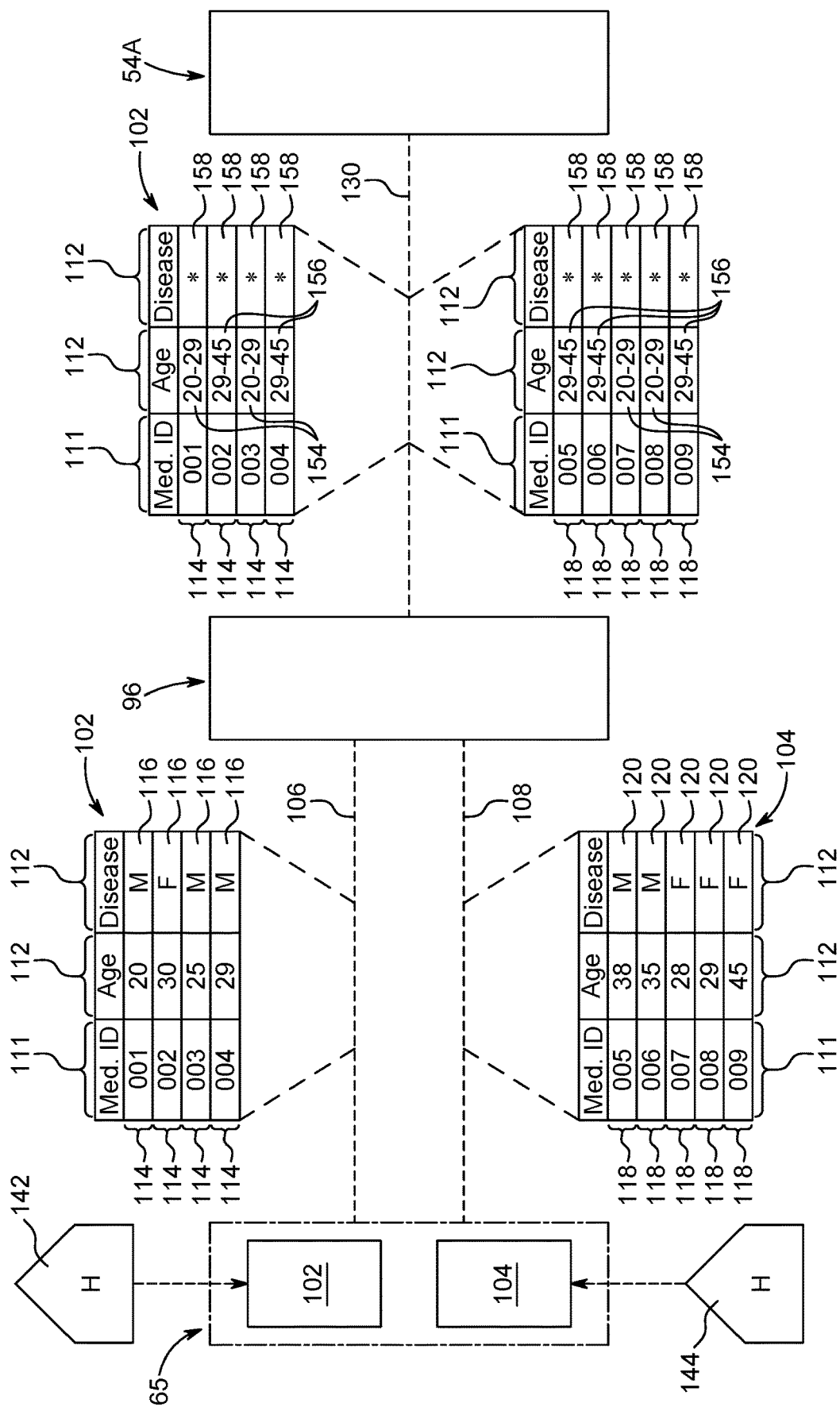
FIG. 3 depicts a practical application of anonymization of distinguishable records coming from multiple datasets, according to one or more implementations of the present invention.

Referring to FIG. 3, the filtration program 96 is shown in accordance with one or more practical implementations of the present disclosure. It should be appreciated that the filtration program 96 may be implemented on any computing apparatus. As an example, the filtration program 96 may be practically implemented on the cloud as discussed above. The filtration program 96 may be implemented on a networking appliance, programmed to recognize identifying information and implement confidential controls to sanitize data before departure. The filtration program 96 may be implemented on a standalone computer operable to receive datasets 102, 104 from a local drive or removable device.

Data from cloud servers or otherwise may be used to perform statistical analysis or other analytics. As an example, a first hospital 142 or data source may provide the digital storage or storage device 65 with a first dataset 102. The first dataset 102 may include structured data. As an example, the first dataset 102 may include first records 114 involving patients of the first hospital 142. Each row of the first dataset 102 may be associated with a first record 114. Quasi-identifiers 112 may define columns of the dataset 102. As such, first records 114 correspond with quasi-identifiers 112 to define first data values 116. As an example, the direct identifier 111 may correspond with a social security number or medical identification number as first data values 116. As an example, the quasi-identifier 112 of ages is associated with 20, 30, 25, and 29 as first data values 116. As another non-limiting example, the quasi-identifier 112 of diseases is associated with macular degeneration, fibromyalgia, macular degeneration, and macular degeneration as first data values 116 (M-F-M-M). The quasi-identifier 112 may be associated with values that are binary, non-binary, numerical, categorical, or otherwise as provided by the data originator, first hospital 142. It should be appreciated that any type of value or information may be stored in the first data values 116. As an example, graphical information or multimedia.

As another, a second hospital 144 may provide the storage device 65 with a second dataset 104. The second dataset 104 may include structured data. As an example, the second dataset 104 may include second records 118. Each row of the second dataset 104 may be associated with a second record 118. Quasi-identifiers 112 define columns of the second dataset 104. As such second records 118 correspond with quasi-identifiers 112 to define second data values 120. As an example, the direct identifier 111 may correspond with a social security number or medical identification number as first data values 116. As an example, the quasi-identifier 112 of ages is associated with 38, 35, 28, 29, and 45 as second data values 120. As another non-limiting example, the quasi-identifier 112 of diseases is associated with macular degeneration, macular degeneration, fibromyalgia, fibromyalgia, and fibromyalgia as second data values 120. The quasi-identifier 112 may be associated with values that are binary, non-binary, numerical, categorical, or otherwise as provided by the data originator, second hospital 144. It should be appreciated that any type of value or information may be stored in the first data values 116.

Any number of datasets 102, 104 may be stored on the storage device 65. The storage device 65 may be a multi-tenant datastore configured to store data from various sources and accessible by various entities. Any number of direct identifiers 111 and quasi-identifiers 112 may be associated with the datasets 102, 104. The direct identifiers 111 and the quasi-identifiers 112 may be completely joinable, partially joinable, or unjoinable among datasets 102, 104 to form a combined dataset. The filtration program 96 may perform clustering on the combined dataset, whether joined, partially joined, or unjoined. In some practical applications datasets 102, 104 may include the same or similar records 114, 118 or the same quasi-identifiers 112.

It should be appreciated that anonymity of datasets 102, 104 may be a term of degree. That is, datasets 102, 104 may be more or less anonymous based on a k-anonymity threshold with respect to their quasi-identifying columns. As an example, records 114, 118 of datasets 102, 104 may be distinguishable such that a one of the first records 114 or the second records 118 has data values 116, 120 that are different (in combination) from another of the first records 114 or the second records 118. It should be appreciated that some values for some quasi-identifiers 112 may be shared. As an example, two records that differ in even one value of quasi-identifying column have a k-anonymity threshold of one. Distinguishable data over any quasi-identifying columns may be further defined as having a k-anonymity of one. As another example, the first records 114 or the second records 118 of datasets 102, 104 are k-anonymous based on a k-anonymity threshold. Datasets 102, 104 may include the k-anonymity threshold or the k-anonymity threshold may be determined by the filtration program 96.

The k-anonymity threshold may be any integer value (e.g., 2, 3, 50-anonymous). As such, a dataset 102, 104 or combination thereof is 2-anonymous when for any record in the dataset there is at least one other record 114, 118 that has the exact same data values 116, 120 for all quasi-identifying columns. Dataset 102, 104 or combination thereof is 3-anonymous when for any record in the dataset there are at least two other records 114, 118 with the same data values 116, 120 for the quasi-identifying columns 112. The datasets 102, 104 may be associated with respective k-anonymity thresholds. As just one of many examples, the first dataset 102 may have a k-anonymity threshold of 2-anonymous, while the second dataset 104 may have a k-anonymity threshold of 3-anonymous. Obfuscation, deletion, omission, generalization, or other alteration of the data values 116, 120 of the quasi-identifying columns 112 may be used to achieve anonymity.

Quasi-identifiers 112 may be pieces of information, or be associated with and correspond with pieces of information, that are not of themselves unique identifiers but are sufficiently well correlated with an entity that they can be combined with other quasi-identifiers 112 to create a unique identifier or unique record. Quasi-identifiers 112 may, alone or in combination, be or become personally identifying information and be combined to form attacks that may expose the identity of an individual. Quasi-identifiers 112 may be contrasted with direct identifiers or unique identifiers (e.g., social security numbers, national IDs) that may be suppressed, encrypted, or masked and treated separately.

Figure 4:
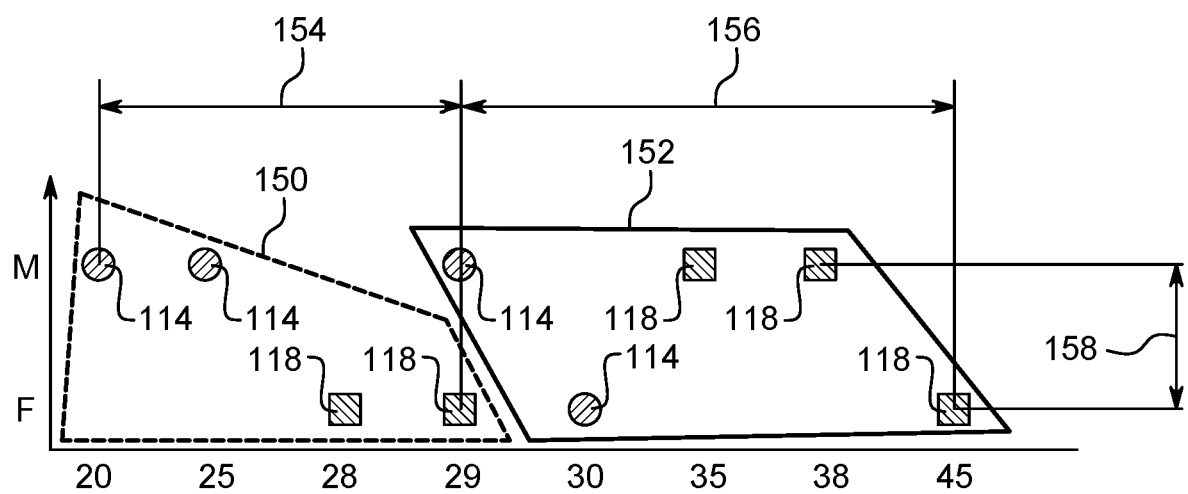
FIG. 4 depicts clusters of datasets having distinguishable records according to one or more implementations of the present invention.

Referring to FIGS. 3-4 collectively, the filtration program 96 may be configured to receive datasets 102, 104. The datasets 102, 104 may be received over input connections 106, 108. The input connections 106, 108 may be network connections, data buses, or any other cloud or non-cloud implement. The filtration program 96 may include instructions to generate clusters 150, 152 using data analytics. Data analytics may include any algorithm including k-means, affinity propagation, mean shift, spectral, ward, agglomerative, DBScan, Birch, Gaussian Mixtures, or any other analytical process for forming clusters 150, 152.

As one example, the records of a first dataset 114 may be represented as vectors based on the values of their quasi-identifying columns and then the k-means algorithm may be used to cluster them. This may include initializing a set of k-means centroids; determining the least squared Euclidean distance between the k-means centroids and the data values 116, 120 of the quasi-identifiers 112; assigning each of the records 114, 118 to one of the centroids as clusters 150, 152; and determining new k-means centroids based on the assigned records 114, 118. It should be appreciated that any clustering algorithm, mentioned or unmentioned, may be used.

These processes may be implemented with the filtration program 96 to form clusters 150, 152, as first cluster 150 and second cluster 152 on records 114, 118 from a combination of datasets 102, 104. As shown, the data values 116, 120 may form points. The data values 116, 120 may form any combination of points, vectors, or other dimensional objects. The first cluster 150 may be defined by a first boundary 154. The second cluster 152 may be defined by a second boundary 156. A third boundary 158 may be defined by one or more of the clusters 150, 152. It should be appreciated that any number of clusters 150, 152 may be used. Any number of boundaries 154, 156, 158 may be used to define the clusters. The boundaries 154, 156, 158 may be associated with or be based on the data values 116, 120. The boundaries 154, 156, 158 may be a selection of the data values 116, 120. The boundaries 154, 156, 158 may be defined to encompass a subset of the data values 116, 120. In such cases, the boundaries 154, 156, 158 may be defined by curves, equations, geometries, or otherwise. The boundaries 154, 156, 158 may be spaced from one or more of the data values 116, 120 to encompass all the data values using predefined curves, equations, or geometries. As shown, the boundary 154 may be greater than maximum value 29, less than minimum value 20, greater than M, or less than F. Indeed, a dataset 102 having a more practical implementation may include any number of diseases and categories. Such boundaries 158 associated disease may be defined as a list of categories (e.g., M-F, M-F-N, M-F-X-N) or any other combination of disease category.

Such boundaries 154, 156, 158 may be used to replace data values 116, 120. The filtration program 96 may include instructions to output the datasets 102, 104 separately on output connection 130. The output connections 130 may be a network connection, a data bus, or any other cloud or non-cloud implement. The output connection 130 may provide the datasets 102, 104 to the same cloud consumer 54A. The output connection 130 may provide the datasets 102, 104 to different cloud consumers 54A. The output connection 130 may return the datasets 102, 104 to the cloud or any other destination. It should be appreciated that in situations where the boundaries 154, 156, 158 replace all categories in a quasi-identifier 112, the boundaries 154, 156, 158 may be indicated as an asterisk.

The clusters 150, 152 may comprise a predetermined collective quantity of first data values 116 and second data values 120. The collective quantity may be based on the desired k-anonymity of the datasets 102, 104 output from the filtration program 96. As an example, if the desired output is k-anonymity, each cluster 150, 152 consists of at least 2 k records 114, 118, at least k records from each dataset 102, 104. That is, 2-anonymity is achieved through at least four records 114, 118 in each cluster 150, 152 created by the filtration program 96, where at least 2 records come from 114 and at least 2 records from 118.

The collective quantity may be based on the number of records 114, 118 in the respective datasets 102, 104. As an example, the collective quantity may maintain a ratio of records 114, 118 from the first dataset 102 and the second dataset 104. That is, if dataset 102 has ten records 114 and dataset 104 has twenty records 118, the collective quantity for each of three clusters may include six, six, and eighteen data records 114, 118, each having one-third (e.g., two, two, six) of the data records 114, 118 from the first dataset 102. For practical reasons, the values may be rounded or approximated.

Figure 5:
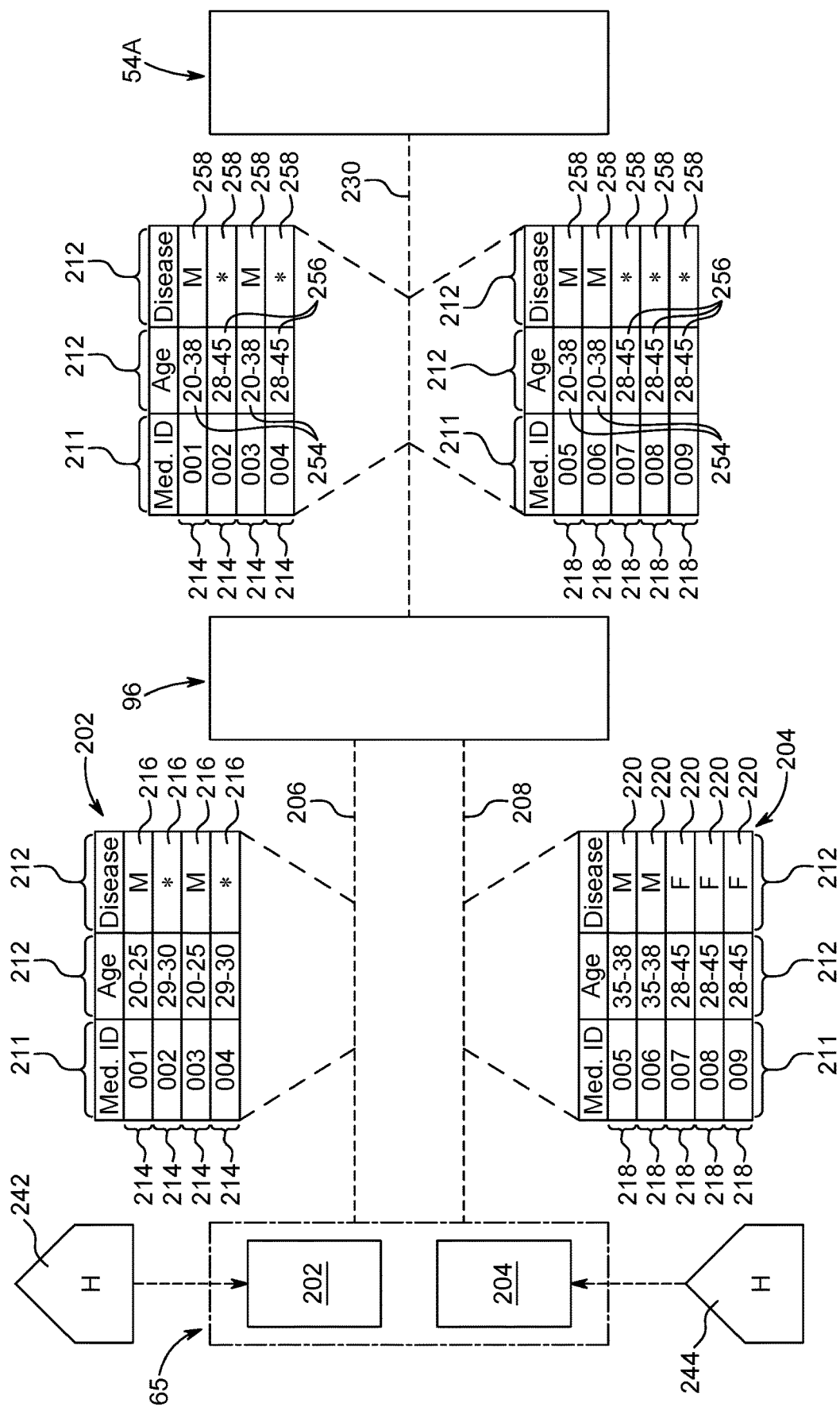
FIG. 5 depicts a practical application of anonymization of anonymous records coming from multiple datasets, according to one or more implementations of the present invention.
Figure 6:
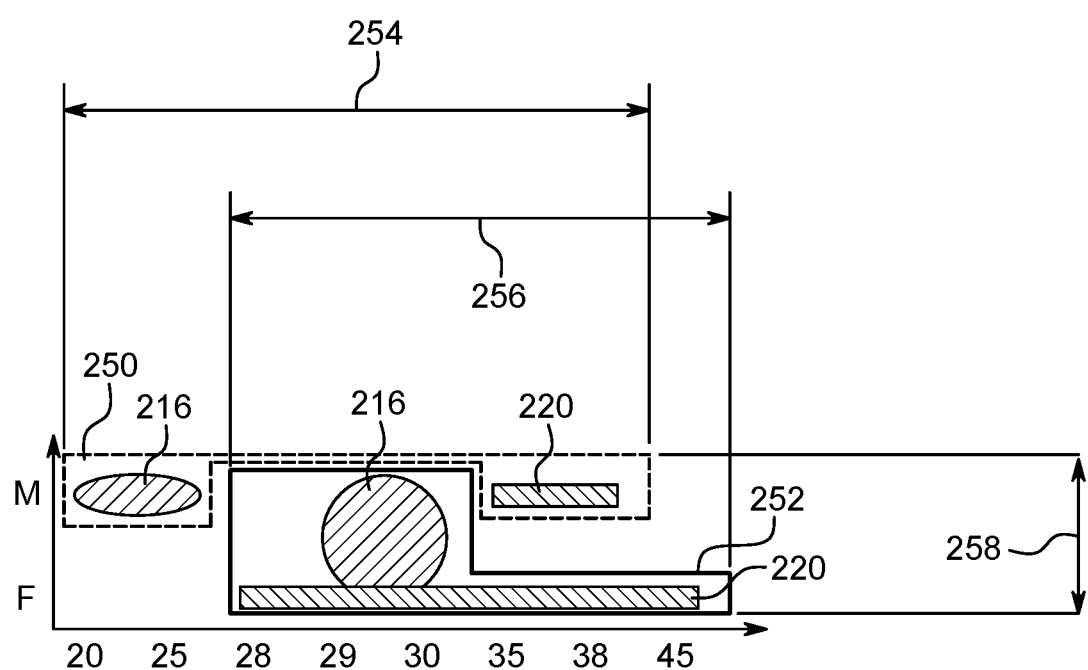
FIG. 6 depicts clusters of datasets having anonymous records according to one or more implementations of the present invention.

Referring to FIGS. 5-6, a data filtration system is shown. Data from cloud servers or otherwise may be used to performed statistical analysis or other analytics. As an example, a first hospital 242 may provide the digital storage or storage device 65 with a first dataset 202. The first dataset 202 may include structured data. As an example, the first dataset 202 may include first records 214. Each row of the first dataset 202 may be associated with a first record 214. Given that the data in FIG. 5 are anonymous, all direct identifiers have been either suppressed or masked. Quasi-identifiers 212 define columns of the dataset 202. As such first records 214 correspond with quasi-identifiers 212 to define first data values 216. As an example, the direct identifier 211 may correspond with a social security number or medical identification number as first data values 216. As an example, the quasi-identifier 212 of ages is associated with generalized data 20-25 and 29-30 as first data values 216. As another non-limiting example, the quasi-identifier 212 of diseases is associated with macular degeneration, *, macular degeneration, and * as first data values 216. The quasi-identifier 212 may be associated with values that are binary, non-binary, numerical, categorical, or otherwise as provided by the data originator, first hospital 242. It should be appreciated that any type of value or information may be stored in the first data values 216. As shown, dataset 202 has anonymity. That is, if direct identifiers 211 are suppressed (e.g., deleted, replaced arbitrarily, otherwise removed) from dataset 202, no records 214 are distinguishable with respect to other records 214 in dataset 202. It should be appreciated that the direct identifiers 211 may be suppressed before being received by the filtration program 96 or by filtration program 96. With regard to k-anonymity, dataset 202 has a k-anonymity threshold of two or is 2-anonymous. This is because the first and third record have the same combination of values for the quasi-identifier columns, and the same holds for the second and fourth record.

As another, a second hospital 244 may provide the storage device 65 with a second dataset 204. The second dataset 204 may include structured data. As an example, the second dataset 204 may include second records 218. Each row of the second dataset 204 may be associated with a second record 218. Quasi-identifiers 212 define columns of the second dataset 204. As such second records 218 correspond with quasi-identifiers 212 to define second data values 220. As an example, the direct identifier 211 may correspond with a social security number or medical identification number as first data values 220. As an example, the quasi-identifier 212 of ages is generalized and associated with 28-45 and 35-38 as second data values 220. As another non-limiting example, the quasi-identifier 212 of diseases are associated with macular degeneration, macular degeneration, fibromyalgia, fibromyalgia, and fibromyalgia as second data values 220. The quasi-identifier 212 may be associated with values that are binary, non-binary, numerical, categorical, or otherwise as provided by the data originator, second hospital 244. It should be appreciated that any type of value or information may be stored in the first data values 216. As shown, dataset 204 has anonymity. That is, if direct identifiers 211 are suppressed from dataset 204, no records 218 are distinguishable with respect to other records 218 in dataset 204. With regard to k-anonymity, dataset 204 has a k-anonymity threshold of two or is 2-anonymous. Datasets 202, 204 are contrasted with datasets 102, 104, where datasets 102, 104 have records 114, 118 that are distinguishable from other records 114, 118 in the respective dataset 102, 104. That is, the present disclosure may be performed on datasets 102, 104, 202, 204 where records are distinguishable or are already anonymous. The datasets 102, 104, 202, 204 may be received in either form.

Additionally, the filtration program 96 may include instructions operable upon execution to anonymize the datasets 102, 104, 202, 204 individually to k-anonymity thresholds associated with each of the datasets 102, 104, 202, 204 respectively before origin anonymization. It should be appreciated that any number of datasets 102, 104, 202, 204 may be received by the filtration program 96 having any number of distinguishable or anonymous characteristics. As an example, the filtration program 96 may receive two distinguishable datasets 102, 104 and two anonymized datasets 202, 204.

Any number of datasets 202, 204 may be stored on the storage device 65. Any number of quasi-identifiers 212 may be associated with the datasets 202, 204. The quasi-identifiers 212 may be completely joinable, partially joinable, or unjoinable among datasets 202, 204 to form a combined dataset. In some practical applications datasets 202, 204 may include the same or similar records 214, 218 or the same quasi-identifiers 212.

It should be appreciated that anonymity may be a term of degree. That is, datasets 202, 204 may be more or less anonymous based on a k-anonymity threshold. As an example, the first records 214 or the second records 218 of datasets 202, 204 are k-anonymous based on a k-anonymity threshold. The k-anonymity threshold may be any numerical value (e.g., 2-anonymous). As such, a dataset 202, 204 or combination thereof is 2-anonymous when there is at least one other record 214, 218 has the same data values 216, 220. Dataset 202, 204 or combination thereof is 3-anonymous when there are at least two other records 214, 218 with the same data values 216, 220. The datasets 202, 204 may be associated with respective k-anonymity thresholds. As just one of many examples, the first dataset 202 may have a k-anonymity threshold of 2-anonymous, while the second dataset 204 may have a k-anonymity threshold of 3-anonymous. Obfuscation, deletion, omission, generalization, or alteration otherwise of the data values 216, 220 may be used to achieve anonymity.

Quasi-identifiers 212 may be pieces of information, or be associated with and correspond with pieces of information, that are not of themselves unique identifiers but are sufficiently well correlated with an entity that they can be combined with other quasi-identifiers 212 to create a unique identifier or unique record. Quasi-identifiers 212 may, alone or in combination, be or become personally identifying information and be combined to form attacks that may expose the identity of an individual. Quasi-identifiers 212 may be contrasted with direct identifiers or unique identifiers (e.g., social security numbers, national IDs) that may be suppressed, encrypted, or masked and treated separately.

Continuing with FIGS. 5-6 collectively, the filtration program 96 may be configured to receive datasets 202, 204. The datasets 202, 204 may be received over input connections 206, 208. The input connections 206, 208 may be network connections, data buses, or any other cloud or non-cloud implement. The filtration program 96 may include instructions to generate clusters 250, 252 using data analytics. Data analytics may include any algorithm including k-means, affinity propagation, mean shift, spectral, ward, agglomerative, DBScan, Birch, Gaussian Mixtures, or any other analytical process for forming clusters 150, 152.

As one example, the k-means algorithm may comprise initializing a set of k-means centroids; determining the least squared Euclidean distance between the k-means centroids and the data values 116, 120; assigning each of the records 114, 118 to one of the centroids as clusters 150, 152; and determining new k-means centroids based on the assigned records 114, 118. It should be appreciated that any clustering algorithm, mentioned or unmentioned, may be used. The clustering algorithm may use a mean or median value of k-anonymous data, such as generalized or suppressed data. The clustering algorithm may use the entire combination of categories as the clustering value. The clustering algorithm may also use a weighted number based on the corresponding number of categories to determine Euclidean distances or densities for clustering. As an example, the generalized M-F-X-N may be considered closer to M-F-X than M-F. It should be appreciated that categories may not be precise or repeatable in all situations.

These processes may be implemented with the filtration program 96 to form clusters 250, 252, as first cluster 250 and second cluster 252 on a combination of datasets 202, 204. As shown, the data values 216, 220 may form points. The data values 216, 220 may form any combination of points, vectors, or dimensional objects. The first cluster 250 may be defined by a first boundary 254. The second cluster 252 may be defined by a second boundary 256. A third boundary 258 may be defined by one or more of the clusters 250, 252. It should be appreciated that any number of clusters 250, 252 may be used. Any number of boundaries 254, 256, 258 may be used to define the clusters 250, 252. The boundaries 254, 256, 258 may be associated with or be based on the data values 216, 220. The boundaries 254, 256, 258 may be a selection of the data values 216, 220. The boundaries 254, 256, 258 may be defined to encompass a subset of the data values 216, 220. In such cases, the boundaries 254, 256, 258 may be defined by curves, equations, geometries, or otherwise. The boundaries 254, 256, 258 may be spaced from one or more of the data values 216, 220 to encompass all the data values 216, 220 using predefined curves, equations, or geometries. As shown, the boundary 254 may be greater than maximum value 38, less than minimum value 20, greater than M, or less than F. Indeed, a dataset 202 having a more practical implementation may include any number of diseases and categories. Such boundaries 158 associated disease may be defined as a list of categories (e.g., M-F, M-F-N, M-F-X-N) or any other combination of disease category.

Such boundaries 254, 256, 258 may be used to replace data values 216, 220. The filtration program 96 may include instructions to output the datasets 202, 204 separately on output connection 230. The output connections 230 may be a network connection, a data bus, or any other cloud or non-cloud implement. The output connection 230 may provide the datasets 202, 204 to the same cloud consumer 54A. The output connection 230 may provide the datasets 202, 204 to different cloud consumers 54A. The output connection 230 may return the datasets 202, 204 to the cloud or any other destination. It should be appreciated that in situations where the boundaries 254, 256, 258 replace all categories in a quasi-identifier 212, the boundaries 254, 256, 258 may be indicated as an asterisk.

The clusters 250, 252 may comprise a predetermined collective quantity of first data values 216 and second data values 220. The collective quantity may be based on the number of records 214, 218 in the respective datasets 202, 204. As an example, the collective quantity may be based on the anonymity factor of the datasets 202, 204. That is, the first dataset 202 may have a k-anonymity threshold of two, and the second dataset 204 may also have a k-anonymity threshold of two. The resulting clusters 250, 252 may have more than the sum of the first k-anonymity threshold associated with the first dataset 202 and the second k-anonymity threshold associated with the second dataset 204. Datasets 202, 204 may include the k-anonymity threshold or the k-anonymity threshold may be determined by the filtration program 96.

It should be appreciated that the terms first and second may refer to any corresponding noun or adjective without the intention of limiting the claims or claimed subject matter. The terms first and second may be interchanged or omitted and are merely used as a means to clarify through identification and not with respect to function.

It should be appreciated that the filtration program 96 may be implemented through hardware or software. In some practical implementations the filtration program 96 may be implemented on specialized hardware. For example, the filtration program 96 may be implemented on networking appliances (e.g., firewall). The filtration program 96 may include instructions that store the datasets 102, 104, 202, 204, or any combination thereof received as packets before sending packets to destinations. The filtration program 96 may then anonymize the datasets 102, 104, 202, 204 before transmission. It should also be appreciated that processing may be optimized through a continual data processing engine configured to incrementally push data into predefined data frames (e.g., APACHE SPARK in HDFS or HBASE).

Figure 7:
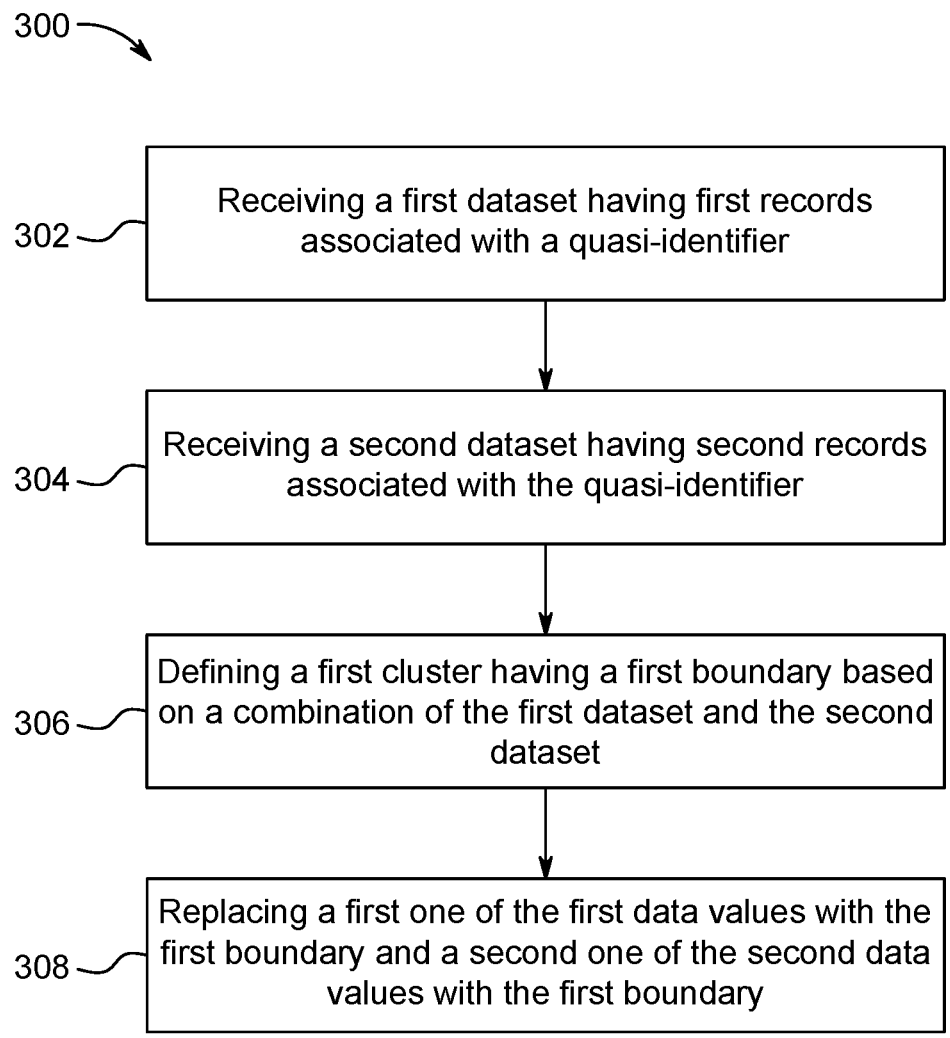
FIG. 7 depicts one or more methods of dataset origin anonymization.

It should be appreciated that practical implementations disclosed herein may include access controls that prevent end users from accessing datasets 102, 104, 202, 204 outside of access privileges until origin anonymization or other anonymizations have taken place. In some practical applications, a local computer system may be operable to prevent access to specific users without secondary approval (e.g., administrator) until anonymization is complete. As an example, the local computer system may be operable to receive the first dataset 102, 202 and provide access based on access controls. The computer system may be operable to receive the second dataset 104, 204 until Referring to FIG. 7, a method 300 for filtering data is shown. Any of the steps depicted may be omitted, rearranged, or duplicated. The steps may be performed sequentially or simultaneously. In step 302, a first dataset 102, 202 having first records 114, 214 associated with a quasi-identifier 112, 212, the first records 114, 214 having respective first data values 116, 216 associated with the quasi-identifier 112, 212 is received. In step 304, a second dataset 104, 204 having second records 118, 218 associated with the quasi-identifier 112, 212, the second records 118, 218 having respective second data values 120, 220 associated with the quasi-identifier 112, 212;

In step 306, a first cluster 150, 250 is created. The first cluster 150, 250 may have a first boundary 154, 254 or another boundary based on a combination of the first dataset 102, 202 and the second dataset 104, 204. In step 308, a first one of the first data values 116, 216 with the first boundary 154, 254 and a second one of the second data values 120, 220 with the first boundary 154, 254 is replaced. It should be appreciated that any boundary 154, 156, 158, 254, 256, 258 or combination thereof may be used to replace data values 116, 216, 120, 220.

The method 300 may include many other steps. Any of the steps mentioned may be performed by instructions coded on a computer, hardware specifically implemented to carry out the instructions, or a combination thereof. The method 300 may include defining the first cluster 150, 250 to comprise a collective quantity of the first records 114, 214 and the second records 118, 218 based on a sum of a first k-anonymity threshold associated with the first dataset 102, 202 and a second k-anonymity threshold associated with the second dataset 104, 204. The k-anonymity threshold may be any integer value that may be assigned or determined to define the anonymity of the datasets 102, 104, 202, 204. 96

The method 300 may also include defining a second cluster 152, 252. The second cluster 152, 252 may have a second boundary 156, 256. The first boundary 154, 254 and the second boundary 156, 256 may cooperate to replace the first data values 116, 216 and the second data values 120, 220. The cooperation may be such that the first dataset 102, 202 and the second dataset 104, 204 have respective k-anonymities greater than or equal to the first k-anonymity threshold and the second k-anonymity threshold, respectively.

Data analytics may be used to form the clusters 150, 152, 250, 252. Data analytics may include any algorithm including k-means, affinity propagation, mean shift, spectral, ward, agglomerative, DBScan, Birch, Gaussian Mixtures, or any other analytical process for forming clusters 150, 152.

As one example, the k-means algorithm may include initializing a set of k-means centroids; determining the least squared Euclidean distance between the k-means centroids and the data values 116, 120; assigning each of the records 114, 118 to one of the centroids as clusters 150, 152; and determining new k-means centroids based on the assigned records 114, 118. It should be appreciated that any clustering algorithm, mentioned or unmentioned, may be used. It should be appreciated that any other algorithm may be used and the included steps, therein, performed.

It should be appreciated that the reference to any of the figures provided throughout this disclosure is intended to be used interchangeably with any other figure or reference. As an example, discussion of FIG. 3 may be used to supplement or augment the discussion of FIG. 5.

It should be appreciated that although shown with two quasi-identifiers 112, 212 (e.g., two dimensions) any number of quasi-identifiers 112, 212 may be used. As such, the clusters 150, 152, 250, 252 may be fluidly defined in any number of dimensions and forms.

It should be appreciated that the boundaries 154, 156, 158, 254, 256, 258 may be any value based on the data values in the cluster, including a mean of the data values, a median of the data values, a hierarchies reduction of the data values, or a value computed from a hierarchy of the domain—in addition to the other boundary definitions described herein or other boundary defining algorithms in the pertinent art.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium, digital storage, or storage device 65 can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process blocks described herein can be incorporated into a more comprehensive procedure or process having additional blocks or functionality not described in detail herein. By utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an exemplary embodiment, the methods described herein can be implemented with any or a combination of the following technologies, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The instructions disclosed herein, which may execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network server for filtering and securing content of datasets in computer readable form designated for release to reduce discernable inferences therein, the network server comprising:
    a digital storage; and
    a filtration program having instructions stored on the digital storage operable upon execution by the network server to:
        receive a first dataset having first records associated with a quasi-identifier, the first records having respective first data values associated with the quasi-identifier,
        receive a second dataset having second records associated with the quasi-identifier, the second records having respective second data values associated with the quasi-identifier,
        define a first cluster having a first boundary based on a combination of the first dataset and the second dataset, and
        replace a first one of the first data values with the first boundary and a second one of the second data values with the first boundary.

2. The network server of claim 1, wherein the instructions are further operable to define the first cluster to comprise a collective quantity of the first records and the second records based on a sum of a first k-anonymity threshold associated with the first dataset and a second k-anonymity threshold associated with the second dataset.

3. The network server of claim 2, wherein the instructions are further operable to define a second cluster having a second boundary, and
    the first boundary and the second boundary cooperate to replace the first data values and the second data values such that the first dataset and the second dataset have respective k-anonymities greater than or equal to the first k-anonymity threshold and the second k-anonymity threshold, respectively.

4. The network server of claim 1, wherein a one of the first records is distinguishable from another of the first records based on the first data values.

5. The network server of claim 1, wherein a one of the first records is anonymous from another of the first records based on the first data values according to a k-anonymity threshold greater than one.

6. The network server of claim 5, wherein the one of the first records is anonymous from another of the first records such that the one of the first records is indistinguishable from the another of the first records based on the first data values.

7. The network server of claim 1, wherein the instructions stored on the digital storage are further operable upon execution by the network server to suppress a one of the first data values associated with the one of the first records associated with the quasi-identifier based on the first boundary and a one of the second data values associated with the one of the second records associated with the quasi-identifier based on the first boundary.

8. The network server of claim 7, wherein the instructions stored on the digital storage are further operable upon execution by the network server to suppress based on the quasi-identifier having only two categories.

9. The network server of claim 1, wherein the instructions stored on the digital storage are further operable upon execution by the network server to generalize a one of the first data values associated with the one of the first records associated with the quasi-identifier based on the first boundary and a one of the second data values associated with the one of the second records associated with the quasi-identifier based on the first boundary.

10. The network server of claim 9, wherein the instructions stored on the digital storage are further operable upon execution by the network server to generalize based on the quasi-identifier having more than two categories.

11. The network server of claim 1, wherein the first boundary is defined by a maximum value of the first data values and the second data values and a minimum value of the first data values and the second data values associated with the first cluster with respect to the quasi-identifier associated with the maximum value and the minimum value.

12. The network server of claim 1, wherein the first boundary is defined by a list of categories comprised by the first cluster.

13. The network server of claim 1, wherein the first dataset and the second dataset are stored on a multitenancy datastore.

14. The network server of claim 13, wherein the multitenancy datastore is stored on the digital storage.

15. The network server of claim 1, wherein the instructions are further operable upon execution by the network server to combine the first dataset and the second dataset.

16. A method for filtering and securing content of datasets in computer readable form designated for release to reduce discernable inferences therein, comprising
    receiving a first dataset having first records associated with a quasi-identifier, the first records having respective first data values associated with the quasi-identifier;
    receiving a second dataset having second records associated with the quasi-identifier, the second records having respective second data values associated with the quasi-identifier;
    defining a first cluster having a first boundary based on a combination of the first dataset and the second dataset; and
    replacing a first one of the first data values with the first boundary and a second one of the second data values with the first boundary.

17. The method of claim 16, further comprising defining the first cluster to comprise a collective quantity of the first records and the second records based on a sum of a first k-anonymity threshold associated with the first dataset and a second k-anonymity threshold associated with the second dataset.

18. The method of claim 17, further comprising defining a second cluster having a second boundary, wherein the first boundary and the second boundary cooperate to replace the first data values and the second data values such that the first dataset and the second dataset have respective k-anonymities greater than or equal to the first k-anonymity threshold and the second k-anonymity threshold, respectively.

19. A system for filtering and securing content of datasets in computer readable form designated for release to reduce discernable inferences therein, the system comprising:
   a storage device comprising:
      a first dataset having first records associated with a quasi-identifier, the first records having respective first data values associated with the quasi-identifier;
      a second dataset having second records associated with the quasi-identifier, the second records having respective second data values associated with the quasi-identifier; and
   a filtration program having instructions stored on a network server operable upon execution by the network server to:
      define a first cluster having a first boundary based on a combination of the first dataset and the second dataset, and
      replace a first one of the first data values with the first boundary and a second one of the second data values with the first boundary.

20. The system of claim 19, further comprising a local computing device, and wherein the instructions are further operable upon execution by the network server to output the first data values and the second data values to the local computing device.

* * * * *